April 8, 1958     E. H. GECKS ET AL     2,829,566
INDEXING TABLE
Filed Feb. 24, 1954
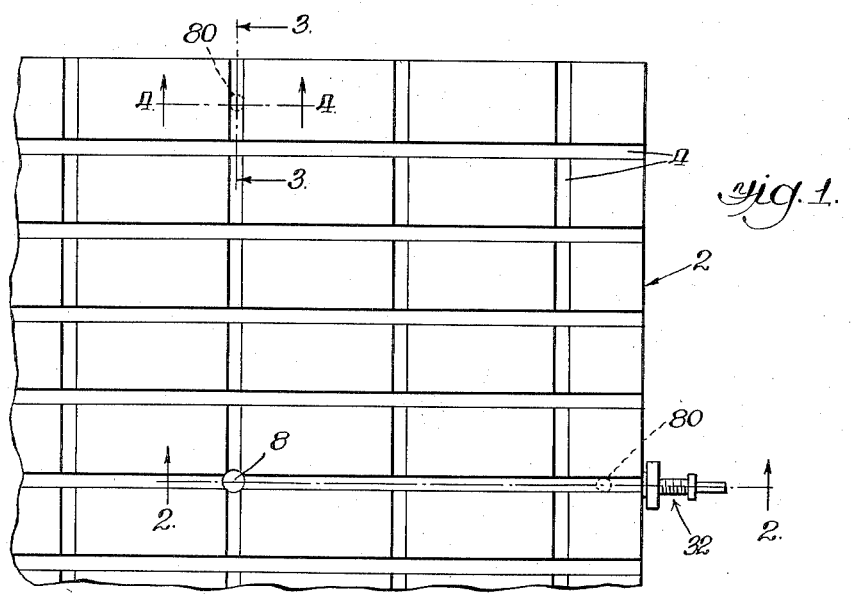
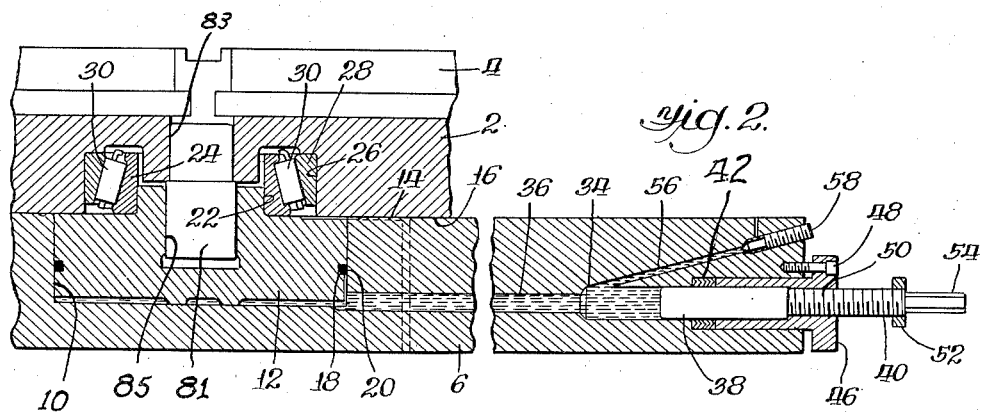
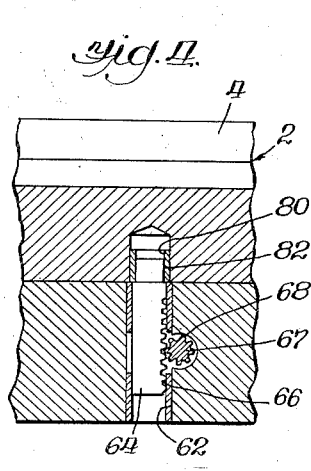
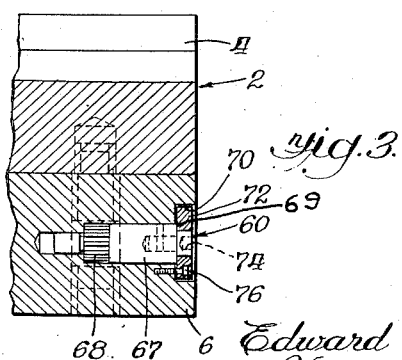
INVENTORS.
Edward H. Gecks
Harry Hines

United States Patent Office 2,829,566
Patented Apr. 8, 1958

2,829,566

INDEXING TABLE

Edward H. Gecks, Lockland, and Harry Hines, Mount Healthy, Ohio, assignors to American Steel Foundries, Chicago, Ill., a corporation of New Jersey Application February 24, 1954, Serial No. 412,355

3 Claims. (Cl. 90—58)

The invention relates to a table indexing arrangement and more particularly to a novel table mounting accommodating easy indexing and positive locking of the table in a plurality of selectable positions.

In many machine tools, for example, the horizontal mill, it is necessary to provide an indexible work mounting table so that various sides of a mounted workpiece may be conveniently brought into proper juxtaposition with the cutting tool. The work table must be supported along its entire underside in order that it present a true horizontal plane. Failure to so support the table results in a tipping movement of the table under the weight of heavy workpieces. This tipping movement, even though only a few thousandths of an inch, destroys machining accuracy. A machine table having a central pivot for rotatable indexing movement and full bearing across its undersurface is extremely difficult to index due to the frictional effect of the bearing between the table and base. Heretofore machine tools of this nature have employed extremely complicated arrangements in order to afford the necessary mechanical advantage to index the table.

Accordingly, it is a primary object of the invention to provide a simple, inexpensive table-base arrangement affording easy table indexing and positive locking of the table in any one of a plurality of selectable positions.

It is a further object of the invention to provide a table-base arrangement wherein hydraulic pressure is utilized to facilitate table indexing.

It is an additional object of the invention to provide a base mounted retractable locking pin arrangement to lock the table in any one of a plurality of selectable positions.

These and other objects of the invention will become apparent in the course of the following description and from an examination of the associated drawings, wherein:

Figure 1 is a fragmentary plan view of a typical mill table incorporating the invention, only one quarter of the table being shown inasmuch as it is generally symmetrical in the other quadrants, Figure 2 is a fragmentary sectional view taken along line 2—2 of Figure 1, with the elevating screw shown in elevation, Figure 3 is a fragmentary sectional view taken along line 3—3 of Figure 1, with the pinion gear arrangement shown in elevation, and Figure 4 is a fragmentary sectional view taken along line 4—4 of Figure 1 with the locking pin shown in elevation.

Describing the invention in detail, a machine table 2 is provided with conventional T-slots 4 whereby a workpiece may be conveniently mounted on the table. The table 2, as illustrated, is of rectangular form though it will be understood that the invention may be readily adaptable to any indexing table regardless of geometric construction. The table 2 is mounted on a fixed machine base 6 and is rotatable about an axis 8 preferably located centrally of the table and base.

Referring now to Figure 2, it will be seen that the base 6 is provided with a centrally located cylindrical recess 10 which has fitted therein a vertically movable actuating piston 12. Additionally, the base 6 presents an upper flat horizontal surface 14, said surface 14 being engaged by a downwardly facing flat horizontal surface 16 of the table 2 when said table is in machining position. The piston 12 has provided a peripheral notch 18 which receives a conventional O-ring 20, said O-ring engaging the cylindrical surface of the recess 10, whereby the piston is in movable fluid tight engagement with the base 6. A machined shoulder 22 is provided on the upper surface of the piston 12, said shoulder having press fitted thereover a bearing cone 24.

Another cylindrical recess 26 is provided in the table 2 directly above the first mentioned cylindrical recess 10. The recess 26 has press fitted therein a bearing cup 28. Roller bearings 30 interconnect the cone 24 and cup 28.

A hydraulic lifting mechanism indicated generally at 32 is provided in the base 6, said hydraulic lifting mechanism comprising a hydraulic cylinder 34 and passage means 36 which establishes communication between the cylindrical recess 10 and the hydraulic cylinder 34. A ram 38 is disposed within the cylinder 34 and has connected thereto an externally extending elevating screw 40. Conventional packing glands 42 surround the ram 38 and provide a fluid tight connection between the ram 38 and the walls of the cylinder 34. The packing glands 42 are held in position by the packing retainer 46, said retainer 46 surrounding the ram 38 and being secured to the base 6 in any conventional manner, as, for example, by cap screws 48. A threadable connection 50 is provided between the elevating screw 40 and the retainer 46. A stop nut 52 is threadably mounted on the elevating screw 40. The elevating screw 40 is additionally provided with a polygonal head 54 on the end thereof, thus affording convenient means to clasp the screw with a tool whereby the screw may be rotated.

A cross drilled hole 56 is provided in the base 6 extending from a point externally of the base and communicating with the hydraulic cylinder 34, thus providing a filler hole to replace hydraulic fluid that may be lost during the operation hereinafter described. A conventional needle screw 58 is provided to act as a cap and close the filler hole 56.

A table locking device is provided in the base 6 and comprises a vertical bushed hole 62 in said base. A locking pin 64 having a gear tooth rack 66 formed on one side thereof, is provided for reciprocal vertical movement in the bushed hole 62. A shaft 67 is mounted in the base 6 for rotatable movement on an axis generally at right angles to the axis of the bushed hole 62. The shaft 67 has formed thereon a pinion gear 68, said pinion gear 68 complementally engaging the rack 66 formed on the locking pin 64 as is best seen in Figure 4. The shaft 67 has additionally formed thereon and centrally located about its axis a hollow hexagon to provide a convenient means for actuating pinion gear 68. This is best shown at 74, Figure 3. The base 6 is recessed as at 70 to accommodate retainer plate 72 which in turn bears directly against a shoulder on shaft 67 as at 69. The retainer plate 72 is secured to the base 6 in any conventional manner as, for example, by cap screws 76. The shaft 67 being provided with a hollow hexagon, as previously mentioned, will accommodate the insertion of a hexagon wrench, or like tool (not shown), which in turn is used to rotate the shaft 67 and the pinion gear 68, the cap screws 76, of course, are previously loosened.

The cap screws 76 may now be tightened to secure retainer plate 72 against shoulder 69 on shaft 67 to prevent any accidental movement of the shaft.

The table 2 is provided with a plurality of bushed holes 80 which are formed to complementally receive the upper end 82 of the locking pin 64 as is best shown in Figure 4. It should be noted that as many holes 80 may be provided in the table 2 as may be desired, each hole providing an additional indexable position in which to lock the table 2.

In operation, when it is desired to rotate the table 2 or index same relative to the base 6, the cap screws are first loosened thereby releasing the retainer plate 72 of the shaft 67. A hexagon wrench or other appropriate tool is connected to the shaft 67 and it is rotated in a counterclockwise direction, as seen in Figure 4, whereby the locking pin 64 is retracted from the receiving hole 80 in the table 2 and descends into the base 6. The elevating screw is then rotated in a direction which will urge the ram 38 inwardly of the cylinder 34, whereby the hydraulic fluid within the cylinder 34 is put under pressure. The pressure of the hydraulic fluid in the cylinder 34 is transmitted through the passage 36 to the cylindrical recess 10 and to the lower side of the piston 12. As the pressure is increased the piston is moved vertically causing the table 2 to be raised from the base 6 and separating the surfaces 14 and 16 on the base and table respectively. The table is now carried by the piston alone through the bearing means which connect the piston to the table. The table may now be easily manually rotated to any new desired position. It should be noted that the hydraulic mechanism 32 may only serve to raise the table a few thousandths of an inch from the base 6, but such slight raising is sufficient to eliminate any friction between the table 2 and the base 6, thus making manual indexing of the table relatively easy, inasmuch as the only friction to be overcome is the slight amount inherent in the frictionless roller bearings connecting the piston and the table.

After the table has been indexed to the new position, the shaft 67 is rotated in a clockwise direction as seen in Figure 4, thus raising the locking pin 64 until it again is inserted into another complementary receiving hole 80. The elevating screw may now be rotated in a direction to move the ram 38 outwardly of the base and relieve the pressure on the hydraulic fluid in the cylinder 34, whereby the table 2 will lower itself and again supporting contact will be established between the surfaces 14 and 16 on the base and table respectively. A guide pin 81 is press fitted into the table 2, as at 83, and a close slip fit in piston 12, as at 85, hence serves to guide the table in its downward movement and to maintain said table in fixed position relative to the base 6.

We claim:

1. In a table mounting arrangement, a fixed base having a flat horizontal upper surface, a table carried thereby having a flat lower surface engaging said upper surface, a hollow cylindrical recess centrally located in the base, another hollow cylindrical recess in the table directly above the first mentioned recess, a movable fluid tight piston in the first mentioned recess, bearing means directly connecting said piston and said table, a hydraulic mechanism in the base comprising a fluid filled cylinder, passage means communicating between the cylinder and the first mentioned recess, a ram in the cylinder and an elevating screw connected to the ram and having a threaded connection to the base, said screw being rotatable to move said ram whereby a fluid pressure is exerted on the piston causing same to move and raise said table, whereby the upper surface and the lower surface are separated to permit easy manual rotation of the table, and guide means mounted in the piston and received within the table for maintaining the table in axial alignment with the base, said guide means accommodating both vertical and rotative movement of said table relative to said base.

2. In a table mounting arrangement the combination of: a base having a flat upper surface and a centrally located recess extending from said upper surface partly through said base; an indexable table having a lower surface engageable with said upper surface; a fluid responsive piston movable vertically in said recess; bearing means directly connecting said piston and said table for transmitting the vertical movement of said piston to said table, said bearing means accommodating rotation of said table relative to the base; and means carried by said piston for maintaining the table and base in axial alignment, said means accommodating rotative indexing movement of the table relative to the base.

3. In a table mounting arrangement the combination of: a base having a flat horizontally disposed upper surface and a centrally located recess extending from said upper surface partly through the base; a table having a lower surface engageable with said upper surface; a fluid responsive piston movable vertically in said recess; bearing means directly connecting said piston and said table for transmitting the vertical movement of said piston to said table and for accommodating rotation of said table relative to said base; and a pin carried by the piston for movement therewith, a portion of said pin projecting upwardly into said table for maintaining said table in axial alignment with said base, said pin also accommodating rotative indexing movement of said table relative to said base.

References Cited in the file of this patent

UNITED STATES PATENTS

| | | |
|---|---|---|
| 828,468 | Finch | Aug. 14, 1906 |
| 1,670,772 | Jones | May 22, 1928 |
| 1,737,002 | DeVlieg | Nov. 26, 1929 |
| 2,615,233 | Ferris | Oct. 28, 1952 |
| 2,615,288 | Klay | Oct. 28, 1952 |

FOREIGN PATENTS

| | | |
|---|---|---|
| 273,740 | Germany | Apr. 5, 1913 |
| 101,292 | Great Britain | Aug. 2, 1916 |
| 726,224 | France | May 25, 1932 |